(12) United States Patent
Treharne et al.

(10) Patent No.: US 11,712,972 B2
(45) Date of Patent: *Aug. 1, 2023

(54) ELECTRIFIED VEHICLE ONE PEDAL DRIVE TRANSITION CONTROL

(71) Applicant: Ford Global Technologies, LLC, Dearborn, MI (US)

(72) Inventors: William David Treharne, Ypsilanti, MI (US); Angel Fernando Porras, Dearborn, MI (US); Bader M. Badreddine, Dearborn Heights, MI (US); Devin James O'Donnell, Detroit, MI (US); Josh Hoop, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

This patent is subject to a terminal disclaimer.

(21) Appl. No.: 17/035,290

(22) Filed: Sep. 28, 2020

(65) Prior Publication Data

US 2022/0097533 A1 Mar. 31, 2022

(51) Int. Cl.
*B60L 15/20* (2006.01)
*B60W 30/18* (2012.01)
(Continued)

(52) U.S. Cl.
CPC ......... *B60L 15/2063* (2013.01); *B60W 10/08* (2013.01); *B60W 20/40* (2013.01);
(Continued)

(58) Field of Classification Search
CPC ............ B60L 15/2063; B60L 2240/12; B60L 2250/12; B60L 50/15; B60L 2240/463;
(Continued)

(56) References Cited

U.S. PATENT DOCUMENTS

| 6,171,213 B1 | 1/2001 | Kosik et al. |
| 7,917,273 B2 | 3/2011 | Alvarez et al. |

(Continued)

FOREIGN PATENT DOCUMENTS

| CN | 112793551 A | * | 5/2021 | ............. B60K 26/02 |
| CN | 112060906 B | * | 4/2022 | ............. B60K 26/02 |

(Continued)

*Primary Examiner* — Brian P Sweeney
(74) *Attorney, Agent, or Firm* — Brooks Kushman PC; David Kelley

(57) ABSTRACT

An electrified vehicle may include an electric motor coupled to a battery to propel and brake the vehicle, a pedal generating a pedal position signal including a released position signal, friction brakes configured to provide a stopping force to vehicle wheels, and a controller programmed to control the motor and the brakes in response to the pedal being released to decelerate the vehicle to a stop, and to control the motor and an engine (in hybrid vehicles) to inhibit propulsive torque to the wheels after stopping due to the pedal released position until receiving driver input indicative of a request for moving the vehicle, such as depressing the brake or accelerator pedal, or activating an automated vehicle maneuver, such as a parking maneuver, cruise control, or stop-and-go control. Inhibiting torque may include inhibiting creep torque and/or operating the electric machine to charge the battery when the engine is running.

19 Claims, 3 Drawing Sheets

(51) Int. Cl.
*B60W 30/06* (2006.01)
*B60W 30/14* (2006.01)
*B60W 20/40* (2016.01)
*B60W 10/08* (2006.01)

(52) U.S. Cl.
CPC .......... *B60W 30/06* (2013.01); *B60W 30/143* (2013.01); *B60W 30/18063* (2013.01); *B60W 30/18127* (2013.01); *B60W 2540/106* (2013.01); *B60W 2540/12* (2013.01)

(58) Field of Classification Search
CPC ... B60L 2250/26; B60W 10/08; B60W 20/40; B60W 30/06; B60W 30/143; B60W 30/18063; B60W 30/18127; B60W 2540/106; B60W 2540/12; B60W 2050/146; B60W 2540/10; B60W 10/06; B60W 50/14; B60W 20/15; B60W 30/17; Y02T 10/72
See application file for complete search history.

(56) References Cited

U.S. PATENT DOCUMENTS

| | | | |
|---|---|---|---|
| 8,858,390 | B2 | 10/2014 | Schiele et al. |
| 8,905,897 | B2 | 12/2014 | Oh et al. |
| 9,234,841 | B2 | 1/2016 | Wang et al. |
| 9,682,705 | B2 | 6/2017 | Khafagy et al. |
| 9,944,200 | B2 | 4/2018 | Ochocinski et al. |
| 10,137,872 | B2 | 11/2018 | Goto |
| 11,214,278 | B2 * | 1/2022 | Hoop ................. B60L 7/22 |
| 2002/0020575 | A1 | 2/2002 | DeLuca et al. |
| 2018/0099673 | A1 | 4/2018 | Pedlar et al. |
| 2022/0080942 | A1 * | 3/2022 | Eberl ................. B60W 10/18 |

FOREIGN PATENT DOCUMENTS

| | | | | |
|---|---|---|---|---|
| WO | 2014057911 | A1 | 4/2014 | |
| WO | 2019/211049 | A1 | 11/2019 | |
| WO | WO-2021108012 | A1 * | 6/2021 | ............. F16D 48/06 |

* cited by examiner

ELECTRIFIED VEHICLE ONE PEDAL DRIVE TRANSITION CONTROL

TECHNICAL FIELD

The present disclosure relates to control of an electrified vehicle when transitioning from one pedal drive.

BACKGROUND

One Pedal Drive (OPD or 1PD) is a vehicle feature that allows a driver to use release of the accelerator pedal to bring the vehicle to a stop without using the brake pedal. For electrified vehicles including electric vehicles powered solely by an electric machine or hybrid vehicles powered by an electric machine and/or an internal combustion engine, depressing the accelerator pedal may control the electric machine (and the engine for hybrid vehicles) to accelerate the vehicle, and releasing the accelerator pedal may control regenerative braking of the electric machine (and engine braking in hybrid vehicles) as well as vehicle friction brakes to decelerate the vehicle and bring the vehicle to a complete stop. Most vehicles provide a creep torque that creates slow motion of the vehicle on flat ground when there is no accelerator or brake pedal input. In 1PD vehicles, the driver may become accustomed to the vehicle remaining stationary without any driver actions that would indicate an intention to make the vehicle move after it has come to a stop, such as pressing the accelerator or brake pedal, changing gear selection, engaging a parking feature, etc.

SUMMARY

Embodiments according to the disclosure include an electrified vehicle having an electric machine coupled to a high-voltage traction battery configured to selectively propel and brake the electrified vehicle, a pedal configured to generate a signal indicative of a range of pedal positions including a released position, friction brakes configured to provide a stopping force to one or more vehicle wheels, and a controller programmed to control the electric machine and the friction brakes in response to the pedal being in the released position to decelerate the vehicle to a stop, and to inhibit propulsive torque to the vehicle wheels after stopping the vehicle in response to the pedal being in the released position until receiving driver input indicative of a request for movement of the electrified vehicle. The controller may be programmed to inhibit the propulsive torque to the vehicle wheels in response to receiving driver input indicative of a request to deactivate one-pedal drive. Inhibiting propulsive torque may include inhibiting creep torque to the vehicle wheels after stopping the vehicle.

Various embodiments include an electrified vehicle having an engine coupled to the electric machine, wherein the controller is programmed to control the engine to provide engine braking in response to the pedal being in the released position, and to control the electric machine to operate as a generator to charge the high-voltage traction battery to inhibit propulsive torque to the vehicle wheels while the engine is running after stopping the vehicle. The controller may also be programmed to stop the engine and/or cutoff fuel to one or more engine cylinders while providing the engine braking.

Embodiments may include an electrified vehicle having a user interface, wherein the request to deactivate one-pedal drive is received via the user interface. The controller may be programmed to communicate with or control the user interface to display a message indicating one-pedal drive is deactivated in response to the driver input indicative of the request for movement. The user interface may be configured to receive input from a user to activate automated parking control, wherein the driver input comprises activation of the automated parking control. Alternatively, or in combination, the driver input indicative of the request for movement may include a signal from the pedal indicating the pedal is not in the released position, or a signal from a brake pedal indicating the brake pedal is depressed. The controller may be programmed to provide creep torque in response to the driver input indicative of the request for movement, which may correspond to a signal associated with depression and/or release of a brake pedal.

Embodiments may also include a method for controlling an electrified vehicle having an electric machine coupled to a high-voltage traction battery configured to selectively propel and brake the vehicle to a stop in response to position of an accelerator pedal, the method comprising, by a controller: controlling the electric machine to provide regenerative braking and controlling friction brakes to provide friction braking to vehicle wheels to stop the electrified vehicle in response to the accelerator pedal being released; and controlling the electric machine to inhibit propulsive torque at the vehicle wheels after receiving a signal to deactivate accelerator pedal control of vehicle braking while the vehicle is stopped until receiving a signal indicating depression of the accelerator pedal, depression of a brake pedal, or activation of an automated vehicle maneuver. The vehicle may include an engine coupled to the electric machine with the method further including controlling the electric machine to charge the high-voltage traction battery while the engine is running and the vehicle is stopped to inhibit the propulsive torque at the vehicle wheels. The method may also include activating a visual indicator associated with deactivation of the accelerator pedal control of vehicle braking in response to the signal indicating depression of the accelerator pedal, depression of the brake pedal, or activation of the automated vehicle maneuver. In one or more embodiments, the vehicle includes an engine coupled to the electric machine and the method further includes controlling the electric machine and the engine to inhibit creep torque applied to the vehicle wheels.

One or more embodiments may include an electrified vehicle having an engine, an electric machine selectively coupled to the engine, a traction battery electrically coupled to the electric machine and configured to selectively propel and brake the electrified vehicle, friction brakes configured to provide a stopping force to vehicle wheels, an accelerator pedal, a user interface, and a controller programmed to control the engine, the electric machine, the friction brakes, and the traction battery in response to the accelerator pedal being released to decelerate the electrified vehicle to a stop, and, in response to receiving a request to deactivate accelerator pedal control of vehicle braking, control the electric machine and the engine to inhibit propulsive torque to the vehicle wheels while the vehicle is stopped until receiving a signal indicating depression of the accelerator pedal, depression of a brake pedal, or activation of an automated vehicle maneuver. The controller may be programmed to control the engine and the electric machine to inhibit creep torque while the vehicle is stopped. The controller may be further programmed to communicate deactivation of the accelerator pedal control of vehicle braking to the user interface in response to receiving the signal indicating depression of the accelerator pedal, depression of the brake pedal, or activation of the automated vehicle maneuver. The automated vehicle maneuver may include an automated parking maneuver and/or automated vehicle speed control.

Embodiments according to the present disclosure may provide associated advantages. For example, the present disclosure provides a system and method for controlling the vehicle during a transition from 1PD to other vehicle features or modes that may initiate vehicle motion. Various embodiments maintain a stationary state when 1PD is deactivated with the vehicle stopped and prevent vehicle motion while the driver may not be fully engaged and therefore may not be expecting the vehicle to move. Vehicle control according to various embodiments provides seamless integration and transition between semi-autonomous features without any unexpected vehicle behavior.

The above advantages and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the teachings of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
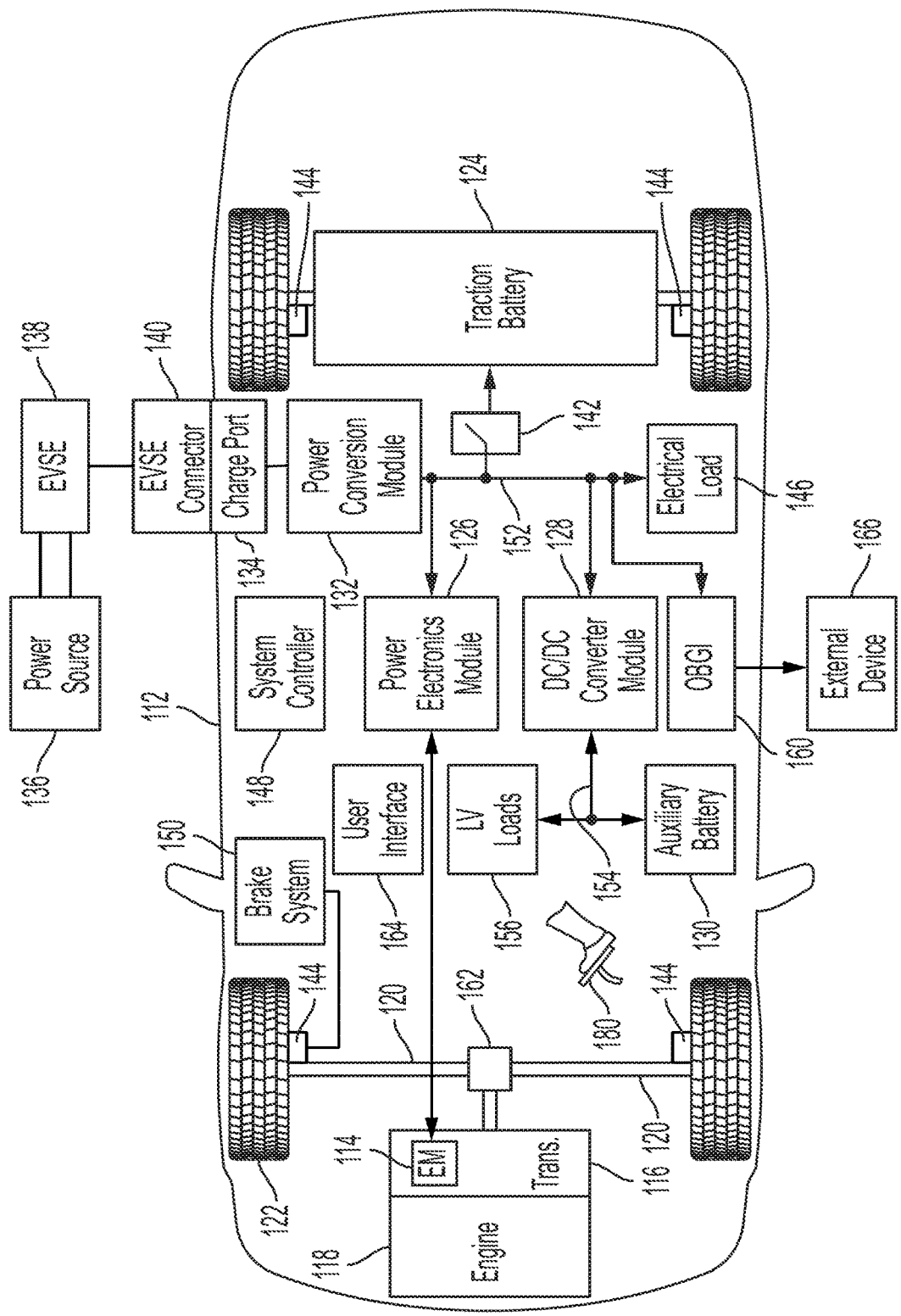
FIG. 1 is a block diagram illustrating a representative configuration of an electrified vehicle having 1PD transition control.

FIG. 1 depicts an electrified vehicle 112 that may be referred to as a plug-in hybrid-electric vehicle (PHEV). Electrified vehicle 112 also is representative of a battery electric vehicle (BEV). In a BEV configuration, the engine 118 is omitted. In other configurations, the electrified vehicle 112 may be a full hybrid-electric vehicle (FHEV) without plug-in capability.

Electrified vehicle 112 may comprise one or more electric machines 114 mechanically coupled to a gearbox or hybrid transmission 116. The electric machines 114 may be capable of operating as a motor and a generator. In addition, the hybrid transmission 116 is selectively mechanically and/or hydraulically coupled to an engine 118 in hybrid implementations of electrified vehicle 112. The transmission 116 may be mechanically coupled to a differential 162 that is configured to adjust the speed of drive shafts 120 that are mechanically coupled to drive wheels 122 of the vehicle 112. The drive shafts 120 may be referred to as the drive axle. In some configurations, a clutch may be disposed between the transmission 116 and the differential 162. The electric machines 114 can provide propulsion and deceleration or regenerative braking capability in response to position of an accelerator pedal 180 and/or a brake pedal (not specifically illustrated) when the engine 118 is turned on or off. Similarly, engine 118 may be operated in an engine braking mode with or without fuel cutoff to provide additional deceleration or braking torque in response to a released position of accelerator pedal 180. The electric machines 114 may also act as generators and can provide fuel economy benefits by recovering energy stored in a high-voltage traction battery 124 that would normally be lost as heat in the friction braking system. Alternatively, or in combination, electric machines 114 may be operated as a generator when the vehicle is on-road or stationary to provide an on-board generator 160 capability and/or to inhibit propulsive torque to the vehicle wheels when the vehicle has been stopped in 1PD mode as described in greater detail herein. The electric machines 114 may also reduce vehicle emissions by allowing the engine 118 to operate at more efficient speeds and allowing the electrified vehicle 112 to be operated in electric mode with the engine 118 off under certain conditions.

A high-voltage battery pack or traction battery 124 stores energy that can be used by the electric machines 114 and/or the on-board generator inverter 160 to power one or more external (customer-supplied) devices 166. The traction battery 124 may provide a high-voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be integrated with the traction battery 124. One or more power electronics modules 126 may be electrically coupled to the high-voltage bus 152. The power electronics modules 126 are also electrically coupled to the electric machines 114 and provide the ability to bi-directionally transfer energy between the traction battery 124 and the electric machines 114. In a regenerative mode, the power electronics module 126 may convert the three-phase AC current from the electric machines 114 acting as generators to the DC voltage compatible with the traction battery 124.

The electrified vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V, 24V, or 48V battery) for charging the auxiliary battery 130. The low-voltage loads 156 may be electrically coupled to the auxiliary battery 130 via the low-voltage bus 154. One or more high-voltage electrical loads 146 (e.g., 100V or higher) may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the electrified vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

The electrified vehicle 112 may include friction brakes 144 associated with one or more vehicle wheels for decelerating the vehicle 112 and preventing motion of the vehicle 112. The friction brakes 144, such as disc or drum brakes, for example, may be hydraulically actuated, electrically actuated, or some combination thereof. The friction brakes 144 may be a part of a brake system 150. The brake system 150 may include other components to operate the friction brakes 144. For simplicity, the figure depicts a single connection between the brake system 150 and one of the friction brakes 144. A connection between the brake system 150 and the other wheel brakes 144 is implied. The brake system 150 may include a controller to monitor and coordinate the brake system 150, which may receive a braking or deceleration request to decelerate, stop, and/or hold the vehicle when operating in 1PD mode in response to accelerator pedal 180 being in a released position. The brake system 150 may monitor the brake components and control the friction brakes 144 for vehicle deceleration. The brake system 150 may respond to driver commands from either the accelerator pedal 180, a brake pedal, and or automated controls associated with automated vehicle maneuvers such as cruise control, automated parking, and stop-and-go control. Brake system 150 may also operate autonomously to implement features such as stability control, traction control, or anti-lock braking control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or dedicated conductors as discrete signals. The vehicle network may include any hardware and software components that aid in transferring signals and data between modules. The vehicle network is not explicitly illustrated in FIG. 1, but it may be implied that the vehicle network may connect to any electronic module that is present in the vehicle 112, including a human-machine interface (HMI) that includes a user interface 164 configured to receive user input and to display information related to vehicle features, settings, operating conditions, and ambient conditions, for example. User interface 164 may include a touch screen or similar device and/or physical buttons, switches, sliders, lights, indicators, etc. In various embodiments, user interface 164 may be used to activate and deactivate 1PD mode to control vehicle braking using the accelerator pedal 180 when activated. User interface 164 may also be used to provide a visual, audible, or other indication of the status of 1PD mode such as whether the 1PD mode is active (ON), inactive (OFF), or in a standby or fault condition, for example.

A vehicle system controller (VSC) 148 may be present to coordinate the operation of the various components. Note that operations and procedures that are described herein may be implemented within or across one or more controllers. Implementation of features that may be described as being implemented by a particular controller or more generally by "a controller" may not necessarily be limited to implementation by a specific controller or by the same controller and may be implemented in whole or in part by one or more other controllers programmed to perform one or more functions or operations. Functions may be distributed among multiple controllers communicating via the vehicle network.

In various embodiments, electrified vehicle 112 includes an electric machine 114 coupled to a high-voltage traction battery 124 configured to selectively propel and brake the electrified vehicle 112. A pedal 180 is configured to generate a signal indicative of a range of pedal positions including a released position. Friction brakes 144 are configured to provide a stopping force to one or more vehicle wheels. A controller 148, 150 is programmed to control the electric machine 114 and the friction brakes 144 in response to the pedal 180 being in the released position to decelerate the vehicle to a stop, and to inhibit propulsive torque from the electric machine 114 and/or the engine 118 to the vehicle wheels after stopping the vehicle 112 in response to the pedal 180 being in the released position until receiving driver input indicative of a request for movement of the electrified vehicle 112. Propulsive torque may be inhibited while engine 118 is running by operating electric machine 114 as a generator to charge traction battery 124 so that little or no propulsive torque is provided to the vehicle wheels until the driver input is received. Driver input may be received via accelerator pedal 180, a brake pedal, or user interface 164 (via a button, switch, touch screen, etc.) to activate a driving feature or mode, such as an automated parking mode, cruise control, stop-and-go control, and the like. As described in greater detail with reference to FIG. 2, after receiving a request to deactivate 1PD mode, controller 148 may communicate an associated command or otherwise control user interface 164 to provide a visual, audible, or other indicator in response to the driver input to indicate termination or deactivation of 1PD mode. Controller 148 may then control electric machine 114 and/or engine 118 to provide creep torque or initiate the requested automated vehicle maneuver. As such, controller 148 controls the vehicle during a transition from 1PD mode to other vehicle features or modes that may initiate vehicle motion by maintaining a stationary state when 1PD is deactivated with the vehicle stopped and preventing vehicle motion while the driver may not be fully engaged and therefore may not be expecting the vehicle to move. This provides seamless integration and transition between semi-autonomous features without unexpected vehicle behavior.

Figure 2:
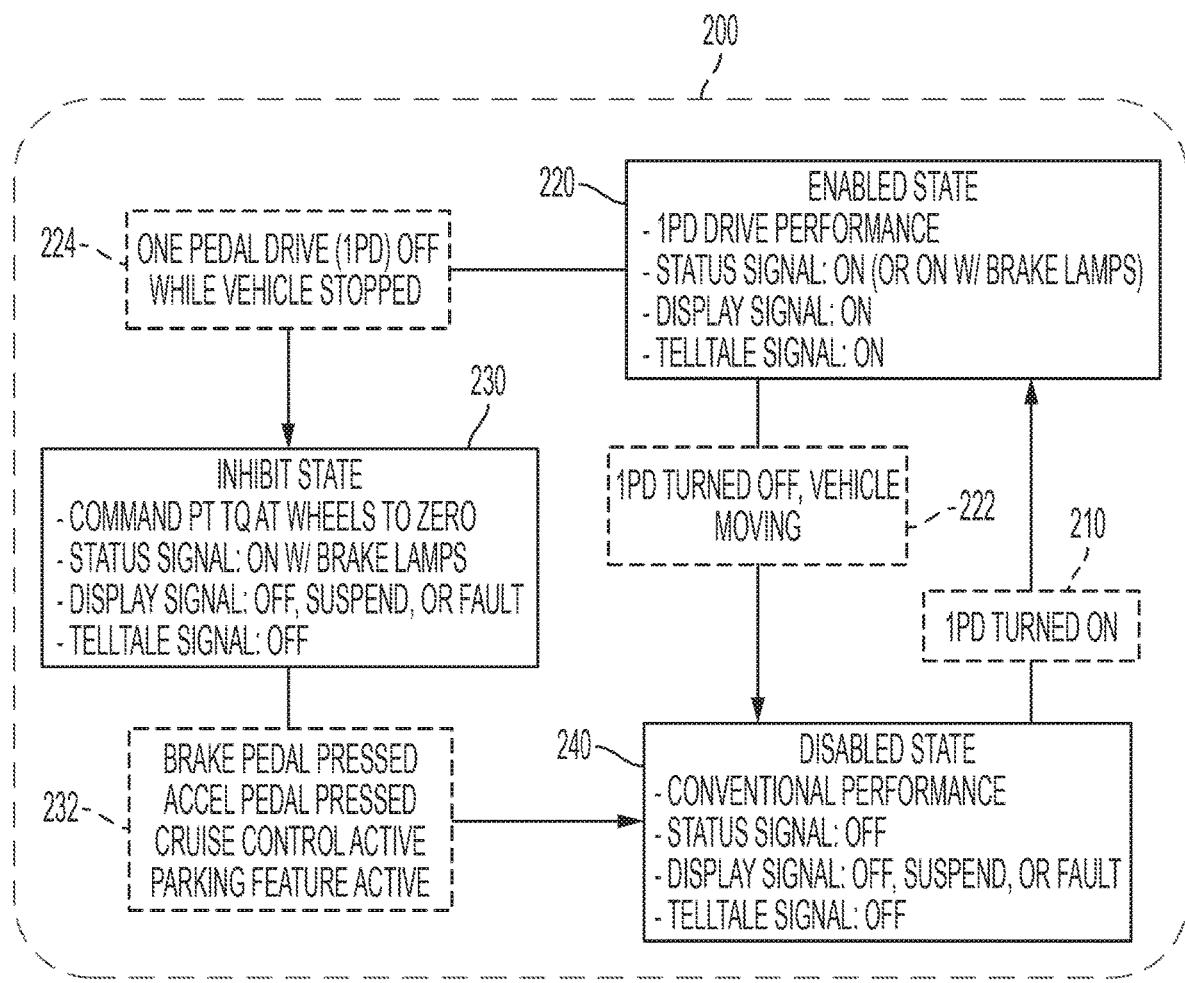
FIG. 2 is a block diagram illustrating a state machine implemented by an electrified vehicle controller for 1PD transition control.

FIG. 2 illustrates a state machine implemented by one or more vehicle controllers, such as controller 148, for controlling transitions between vehicle control modes including transitioning to/from a 1PD mode to one or more automated vehicle control modes. The state machine illustrated in FIG. 2 as well as any other processes, methods, or algorithms disclosed herein can be deliverable to and/or implemented by a processing device, controller, or computer, which can include any existing programmable microprocessor, electronic control unit or controller, or a dedicated electronic control circuits or other devices. Similarly, the processes, methods, or algorithms can be stored as data and instructions executable by a controller, processor, or computer in many forms including, but not limited to, information permanently stored on persistent non-writable storage media such as ROM devices and persistent or temporary information alterably stored on writeable storage media such as RAM devices, flash devices, and/or other solid state storage devices. The processes, methods, or algorithms can also be implemented in a software executable object or code. Alternatively, the processes, methods, or algorithms can be embodied in whole or in part using suitable hardware components and circuits, such as Application Specific Integrated Circuits (ASICs), Field-Programmable Gate Arrays (FPGAs), state machines, controllers or other hardware components or devices, or a combination of hardware, firmware, and software components.

As illustrated in FIG. 2 and with reference to FIGS. 1 and 2, a representative 1PD state machine controls transitions to/from 1PD mode in which the electrified vehicle 112 controls the electric machine 114, friction brakes 144, and an optional engine 118 (in hybrid vehicles) to decelerate the vehicle to a stop in response to accelerator pedal 180 being in a released position. The 1PD mode may be enabled in response to an associated input signal 210 from a user interface 164, which may include a switch, button, touch screen, or the like. State machine 200 includes an enabled state 220 that controls the vehicle to provide regenerative braking, friction braking, and/or engine braking in response to a predetermined decrease in accelerator pedal position. The vehicle may be controlled to come to a stop in response to a fully released accelerator pedal position while the 1PD mode is enabled. Furthermore, propulsive torque at the vehicle wheels may be inhibited while the vehicle is stopped, which may include inhibiting creep torque from the electric machine 114, or controlling the electric machine and engine to operate the electric machine 114 as a generator and charge the traction battery 124 while the engine 118 is running with the vehicle stopped. When in the enabled state 220, controller 148 may provide a display status signal as ON and may illuminate brake or stop lamps. In addition, the controller 148 may communicate or command display of a message or other indicator on the user interface 164 screen based on the display status signal being ON, and activate or illuminate a secondary indicator, such as a lighted button or switch in response to the telltale signal status being ON.

The state machine may transition from the enabled state 220 to an INHIBIT state 230 in response to receiving an input signal 224 corresponding to deactivation of the 1PD mode while the vehicle is stopped. To avoid any unexpected vehicle behavior, the inhibit state 230 commands powertrain torque to zero, i.e. inhibits propulsive torque at the vehicle wheels. The status signal for 1PD remains ON with the brake lamps illuminated and the 1PD control remains active with respect to control of the electric machine 114, engine 118, and/or friction brakes 144 to keep the vehicle stationary. The display signal is changed from ON to one of OFF, SUSPENDED, or FAULTED depending on the current operating conditions. A corresponding visual or audible indicator may be displayed via the user interface 164 to provide feedback to the driver in response to requesting deactivation of 1PD mode. A telltale signal may be used to illuminate a secondary output of the user interface 164, such as a light or illuminated button, and is set to OFF. Propulsive torque at the wheels is inhibited while in the INHIBIT state until receiving a signal indicating the driver's intent to move the vehicle as represented at 232. In response, state machine 200 transitions from the INHIBIT state to the DISABLED state 240. Transition signal 232 may be generated by depressing the brake pedal, depressing the accelerator pedal, or activation of an automated vehicle feature/maneuver, such as an automated parking feature (Fully Automatic Parking Assist (FAPA), or Remote Parking Assist (RePA)) or vehicle speed control, such as adaptive cruise control or stop-and-go control, for example. The requirement for driver engagement via operation of the accelerator or brake pedal, or activation of an automated driving feature ensures that the transition to a conventional drive mode with possible vehicle motion occurs only when the driver is attentive.

In the DISABLED state 240, all characteristics of 1PD are deactivated and conventional driving control using the accelerator pedal 180 and brake pedal is enabled. The electric machine 114 and optional engine 118 (for hybrid vehicles) may be operated to provide creep torque when the accelerator pedal is in the released position and 1PD mode is disabled by driver selection or an error or fault condition. As also illustrated in FIG. 2, state machine 200 may transition from the ENABLED state 220 to the DISABLED state 240 in response to receiving a request signal to deactivate 1PD mode while the vehicle is moving as represented at 222. The display signal is set to OFF, SUSPENDENDED, or FAULTED based on current operating conditions and a corresponding message may be displayed on the user interface 164. Similarly, the telltale signal is set to OFF and a corresponding light, switch, or other indicator is deactivated in response.

Figure 3:
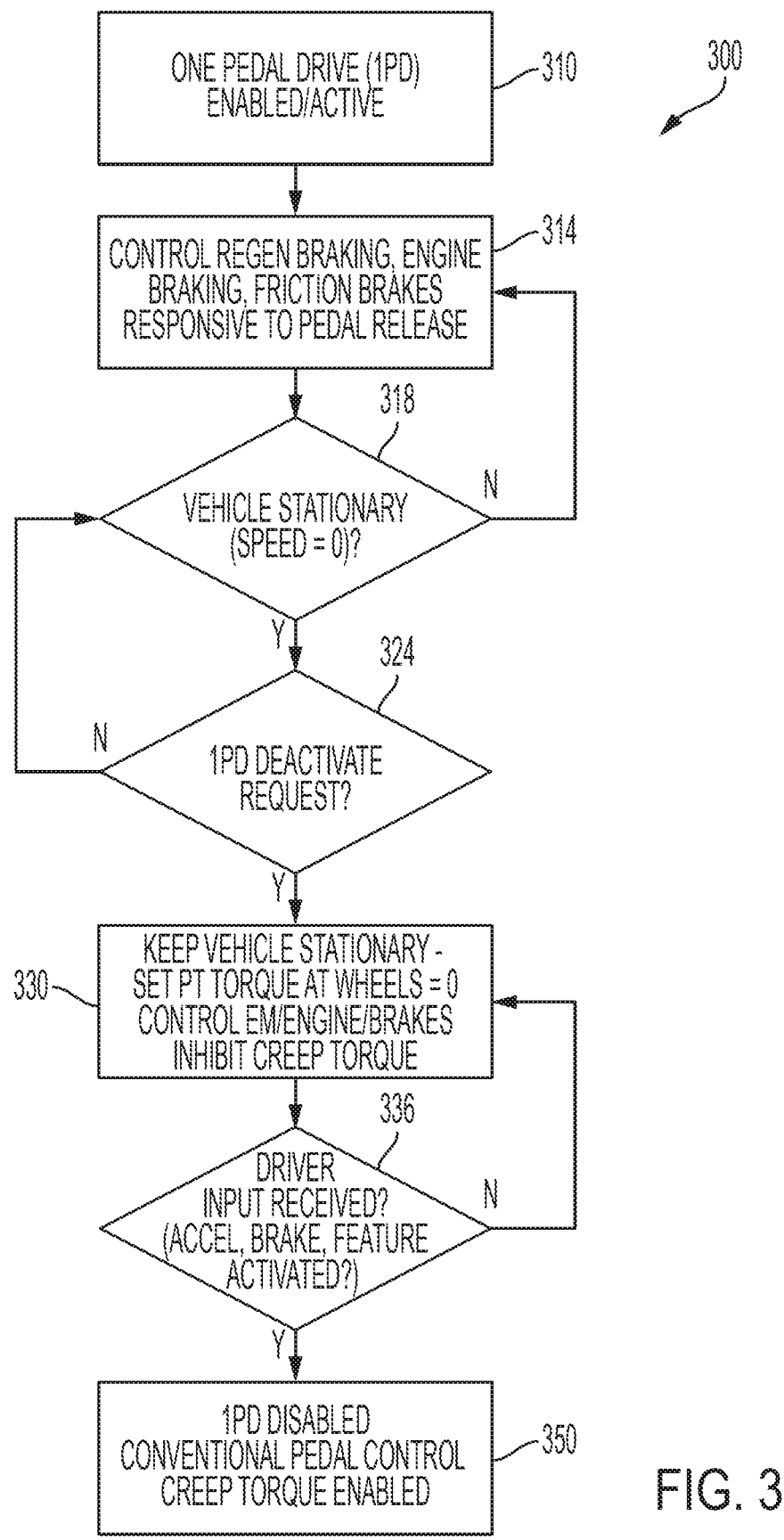
FIG. 3 is a flowchart illustrating operation of a representative system or method for controlling transitions from 1PD in an electrified vehicle.

FIG. 3 is a flow chart illustrating operation of a system or method for controlling an electrified vehicle having a 1PD mode. The strategy or logic 300 may be implemented by one or more vehicle or subsystem controllers as previously described. Block 310 represents receiving an input signal to activate or enable 1PD control. While operating in 1PD control, one or more controllers may control the electric machine, engine (for hybrid vehicles), and friction brakes to provide deceleration to bring the vehicle to a stop in response to the accelerator pedal being released as represented by blocks 314 and 318. The system and method include keeping the vehicle stationary at 330 in response to receiving a 1PD deactivation request as represented at 324. Block 330 may include commanding powertrain torque at the vehicle wheels to zero and/or activating vehicle friction brakes while the vehicle is stopped. Commanding powertrain propulsive torque to zero at the vehicle wheels may include inhibiting creep torque from the electric machine and engine (for hybrid vehicles). In various embodiments, commanding powertrain torque to zero may include engine shutdown or operating the electric machine as a generator to charge the battery such that net torque delivered to the wheels is zero or near zero to keep the vehicle stationary. The electric machine, engine, and friction brakes may be controlled to keep the vehicle stationary until receiving a signal indicating driver attentiveness as represented at 336. A driver attentiveness signal may include a signal indicating depression of the accelerator pedal, depression of a brake pedal, or activation of an automated vehicle maneuver. Automated vehicle maneuvers or features may include semi-automated or fully automated features, such as parking assist, intelligent/adaptive cruise (speed) control, stop-and-go control, and the like. The system and method then transition control to conventional driving mode as indicated at 350.

As illustrated and described with respect to FIGS. 1-3, embodiments according to the present disclosure provide a system and method for controlling an electrified vehicle during a transition from 1PD to other vehicle features or modes that may initiate vehicle motion. Various embodiments maintain a stationary state when 1PD is deactivated after coming to a stop in response to releasing the pedal and prevent vehicle motion while the driver may not be fully engaged and therefore may not be expecting the vehicle to move. Vehicle control according to various embodiments provides seamless integration and transition between 1PD and autonomous or semi-autonomous features without any unexpected vehicle behavior prior to driver attentiveness or engagement.

While representative embodiments are described above, it is not intended that these embodiments describe all possible forms encompassed by the claims. The words used in the specification are words of description rather than limitation, and it is understood that various changes can be made without departing from the disclosure. As previously described, the features of various embodiments can be combined to form further embodiments of the claimed subject matter that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications or implementations.

What is claimed is:

1. An electrified vehicle comprising:
an electric machine coupled to a high-voltage traction battery configured to selectively propel and brake the electrified vehicle;
a pedal configured to generate a signal indicative of a range of pedal positions including a released position;
friction brakes configured to provide a stopping force to one or more vehicle wheels;
a user interface; and
a controller programmed to control the electric machine and the friction brakes in response to the pedal being in the released position to decelerate the vehicle to a stop, and to inhibit propulsive torque to the vehicle wheels after stopping the vehicle and one-pedal drive being deactivated until receiving driver input indicative of a request for movement of the electrified vehicle.

2. The electrified vehicle of claim 1 wherein the controller is further programmed to inhibit the propulsive torque to the vehicle wheels in response to receiving a system fault.

3. The electrified vehicle of claim 2 wherein the controller is programmed to inhibit creep torque to the vehicle wheels after stopping the vehicle until receiving the driver input indicative of a request for movement of the electrified vehicle.

4. The electrified vehicle of claim 3 further comprising an engine coupled to the electric machine, wherein the controller is programmed to control the engine to provide engine braking in response to the pedal being in the released position, and to control the electric machine to operate as a generator to charge the high-voltage traction battery to inhibit propulsive torque to the vehicle wheels while the engine is running after stopping the vehicle.

5. The electrified vehicle of claim 4 wherein the controller is further programmed to cutoff fuel to engine cylinders while providing the engine braking.

6. The electrified vehicle of claim 1 wherein the controller is programmed to control the user interface to display a message indicating one-pedal drive is deactivated in response to the driver input indicative of the request for movement.

7. The electrified vehicle of claim 1 wherein the user interface is configured to receive input from a user to activate automated parking control, and wherein the one-pedal drive is deactivated in response to activation of the automated parking control.

8. The electrified vehicle of claim 1 wherein the driver input indicative of the request for movement comprises the signal from the pedal indicating the pedal is not in the released position.

9. The electrified vehicle of claim 1 wherein the controller is programmed to provide creep torque in response to the driver input indicative of the request for movement while the one-pedal drive is deactivated.

10. The electrified vehicle of claim 9 further comprising a brake pedal, wherein the controller is programmed to provide the creep torque in response to a signal associated with depression of the brake pedal.

11. An electrified vehicle comprising:
an electric machine coupled to a high-voltage traction battery configured to selectively propel and brake the electrified vehicle;
an internal combustion engine coupled to the electric machine;
a pedal configured to generate a signal indicative of a range of pedal positions including a released position;
friction brakes configured to provide a stopping force to one or more vehicle wheels; and
a controller programmed to control the internal combustion engine, the electric machine, and the friction brakes in response to the pedal being in the released position to decelerate the vehicle to a stop, and to apply the friction brakes after the vehicle comes to a stop until the pedal is depressed beyond the released position.

12. The electrified vehicle of claim 11 wherein the controller is further programmed to control the internal combustion engine to provide engine braking in response to the pedal being in the released position, and to control the electric machine to provide regenerative braking to decelerate the vehicle to a stop in response to the pedal being in the released position.

13. The electrified vehicle of claim 12 wherein the controller is further programmed to cutoff fuel to engine cylinders while providing the engine braking.

14. The electrified vehicle of claim 13 wherein the controller is further programmed to control the internal combustion engine and the electric machine to provide creep torque in response to the pedal being depressed beyond the released position after the vehicle comes to a stop.

15. The electrified vehicle of claim 14 wherein the controller is further programmed to inhibit the creep torque in response to the pedal being in the released position.

16. The electrified vehicle of claim 15 wherein the controller is further programmed to inhibit the creep torque in response to a system fault.

17. An electrified vehicle comprising:
 an electric machine coupled to a high-voltage traction battery configured to selectively propel and brake the electrified vehicle;
 a pedal configured to generate a signal indicative of a range of pedal positions including a released position;
 friction brakes configured to provide a stopping force to one or more vehicle wheels; and
 a controller programmed to control the electric machine and the friction brakes in response to the pedal being in the released position to decelerate the vehicle to a stop, and to inhibit propulsive torque to the vehicle wheels after stopping the vehicle.

18. The electrified vehicle of claim 17 wherein the controller is further programmed to control the electric machine and the friction brakes in response to the pedal being in the released position to decelerate the vehicle to a stop until receiving driver input indicative of a request for movement of the electrified vehicle.

19. The electrified vehicle of claim 18 wherein the controller is further programmed to control the electric machine to provide creep torque to vehicle wheels in response to receiving the driver input indicative of a request for movement of the electrified vehicle.

* * * * *